US008035263B2

(12) United States Patent
Kienzler et al.

(10) Patent No.: US 8,035,263 B2
(45) Date of Patent: Oct. 11, 2011

(54) ELECTRIC MOTOR

(75) Inventors: Roland Kienzler, Triberg-Nussbach (DE); Ismail Altindis, Furtwangen (DE); Reimund Weisser, Königsfeld-Erdmannsweiler (DE); Jürgen Maier, Dornhan (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 408 days.

(21) Appl. No.: 11/718,800

(22) PCT Filed: Sep. 2, 2005

(86) PCT No.: PCT/EP2005/009442
§ 371 (c)(1),
(2), (4) Date: May 7, 2007

(87) PCT Pub. No.: WO2006/050765
PCT Pub. Date: May 18, 2006

(65) Prior Publication Data
US 2007/0296292 A1    Dec. 27, 2007

(30) Foreign Application Priority Data
Nov. 10, 2004  (DE) .................... 20 2004 017 721 U

(51) Int. Cl.
*H02K 11/00* (2006.01)
*H02K 3/50* (2006.01)
*H02K 3/52* (2006.01)
*H02K 3/38* (2006.01)

(52) U.S. Cl. .......... 310/71; 310/202; 310/203; 310/208; 310/179

(58) Field of Classification Search ................. 310/71, 310/202, 203, 208, 179; *H02K 3/50, 3/52, H02K 3/38, 11/00*
See application file for complete search history.

(56) References Cited

U.S. PATENT DOCUMENTS

| 4,182,026 | A |   | 1/1980  | Searle .................... 29/596 |
| 4,287,446 | A |   | 9/1981  | Lill et al. ................ 310/71 |
| 5,457,366 | A |   | 10/1995 | Wehberg et al. .......... 318/439 |
| 5,633,542 | A | * | 5/1997  | Yuhi et al. ............. 310/40 MM |
| 5,769,607 | A |   | 6/1998  | Neely et al. ............. 416/189 |
| 5,828,147 | A |   | 10/1998 | Best et al. ................ 310/71 |
| 6,177,741 | B1|   | 1/2001  | Lütkenhaus et al. ....... 310/71 |

(Continued)

FOREIGN PATENT DOCUMENTS
CA          2 349 237         5/2000
(Continued)

*Primary Examiner* — Quyen Leung
*Assistant Examiner* — Terrance Kenerly
(74) *Attorney, Agent, or Firm* — Milton Oliver, Esq.; Oliver Intellectual Property LLC

(57) ABSTRACT

An electric motor has a rotor (52) rotatable around a rotation axis (56) and has a stator (60) arranged around said rotor (52), which stator is equipped with poles (11' to 16'). Each pole has an individual winding (11 to 16), and the latter together form a winding arrangement (30) that serves to generate a rotating field. Arranged approximately concentrically with the rotation axis (56) is an arrangement having electrical connection elements (U, V, W, U', V', W'). The latter are equipped with mounting elements (34, V1, W1, U'1, V'1, 32, 36) to each of which an associated end of an individual winding is mechanically and electrically connected. A connection arrangement (40) has a plurality of conductors (42, 44, 46) each of which is connected, by means of a welded connection (155), to the connection elements of the stator in order to electrically interconnect them in a predetermined fashion.

16 Claims, 16 Drawing Sheets

U.S. PATENT DOCUMENTS

| | | | |
|---|---|---|---|
| 6,472,783 B1 | 10/2002 | Witthohn et al. | 310/68 R |
| 6,570,280 B2 * | 5/2003 | Takahashi | 310/71 |
| 6,919,665 B2 | 7/2005 | Murakami et al. | 310/216 |
| 7,196,443 B2 | 3/2007 | Kimura et al. | 310/71 |
| 2003/0151317 A1 * | 8/2003 | Yoshida et al. | 310/71 |
| 2003/0201688 A1 * | 10/2003 | Yamamura et al. | 310/216 |
| 2004/0007935 A1 | 1/2004 | Kimura et al. | 310/254 |
| 2005/0082931 A1 | 4/2005 | Burgbacher | 310/179 |
| 2006/0091745 A1 | 5/2006 | Klappenbach et al. | 310/71 |
| 2007/0188030 A1 * | 8/2007 | Drubel et al. | 310/71 |

FOREIGN PATENT DOCUMENTS

| | | |
|---|---|---|
| DE | 41 22 529 | 1/1993 |
| DE | 195 44 830 | 6/1997 |
| DE | 197 40 938 | 3/1999 |
| DE | 199 24 325 A1 | 12/1999 |
| DE | 198 50 818 | 5/2000 |
| DE | 203 00 478 U | 3/2003 |
| EP | 0 777312 | 6/1997 |
| EP | 1 040 550 A1 | 10/2000 |
| EP | 1 111 757 A | 6/2001 |
| EP | 1 016 199 B | 11/2001 |
| GB | 2 050 530 | 1/1981 |
| JP | 2002-215303 | 5/2002 |
| WO | WO 99-33157 | 7/1999 |
| WO | WO 00-48292 | 8/2000 |
| WO | WO 2004-062066 | 7/2004 |

* cited by examiner

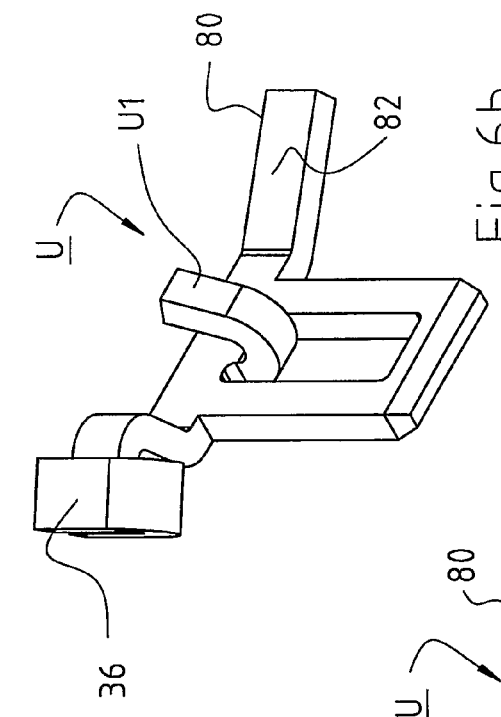
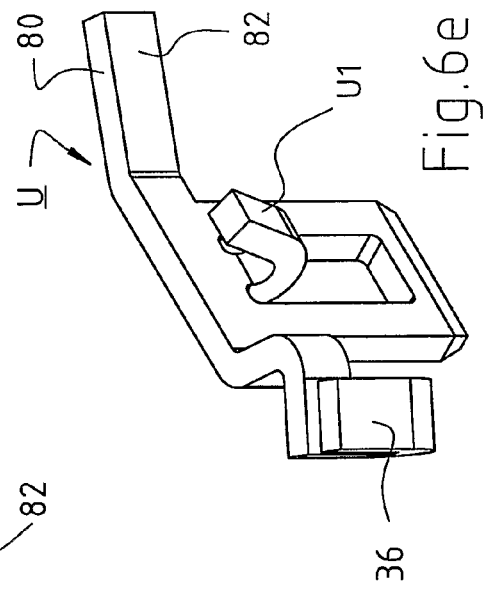
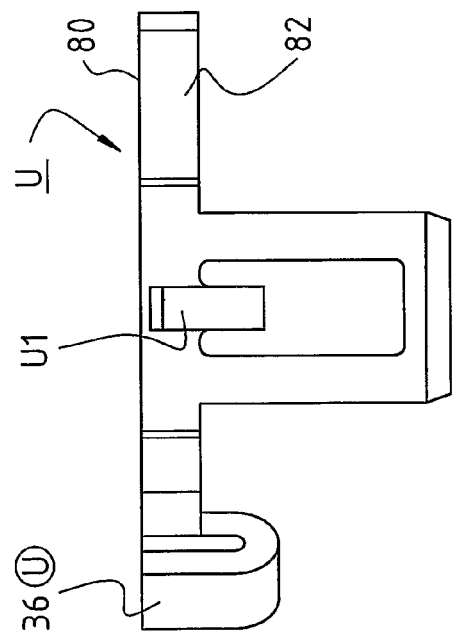
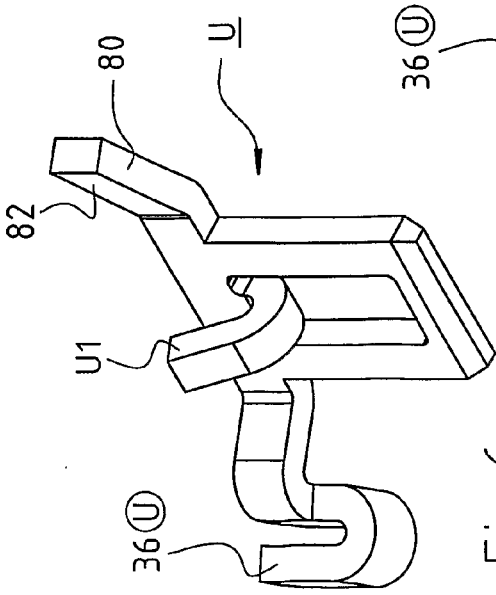
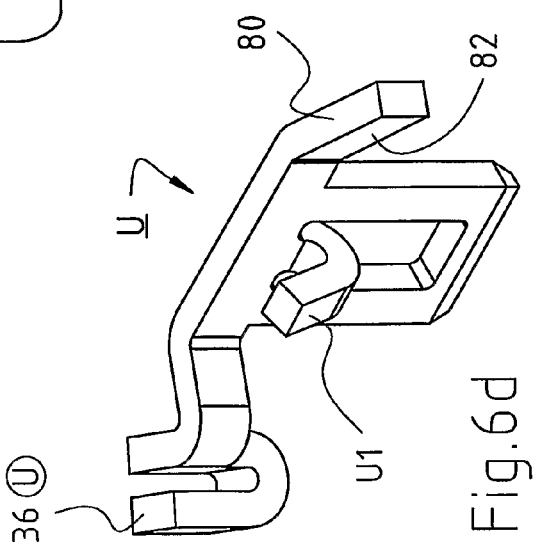

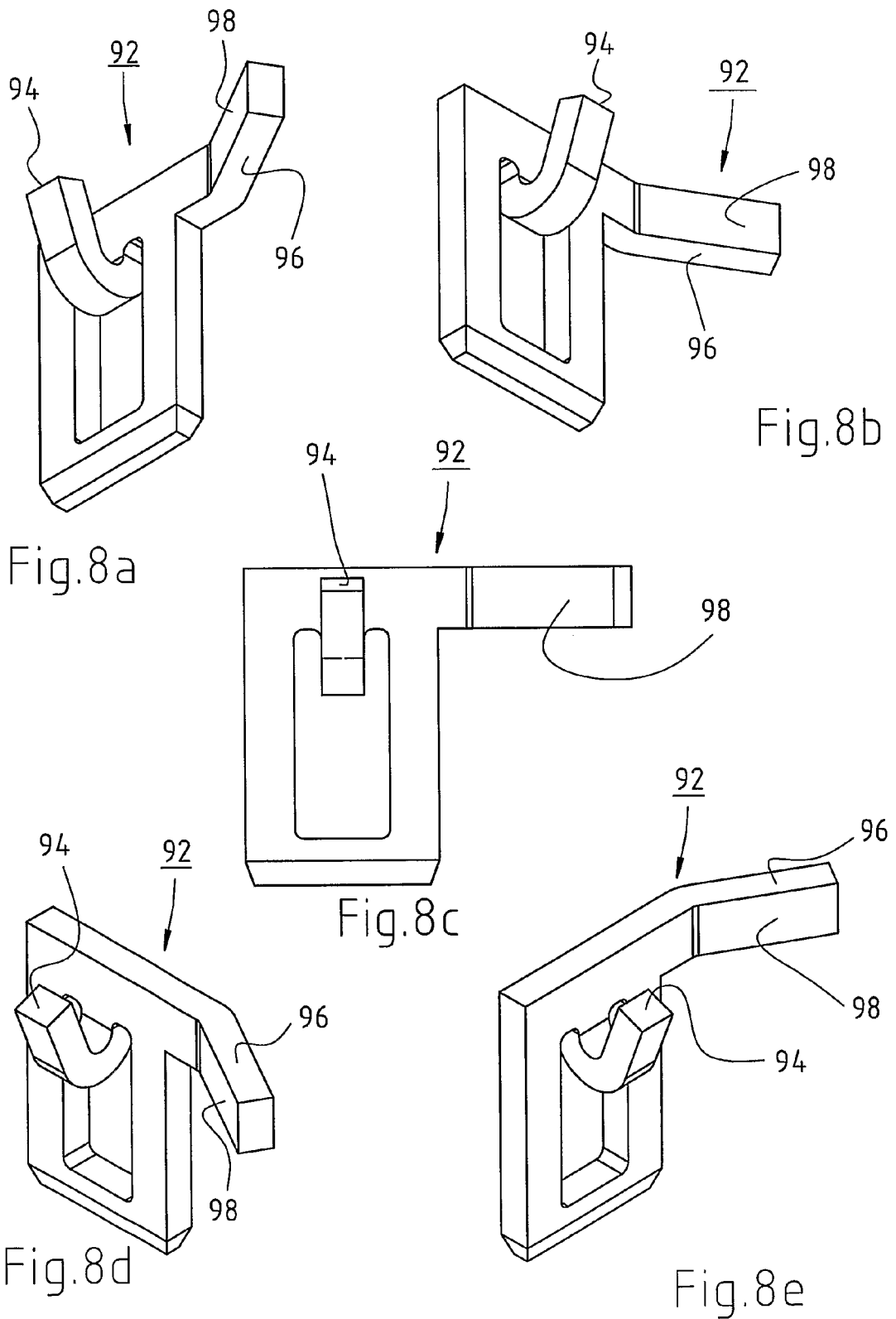

US 8,035,263 B2

ELECTRIC MOTOR

CROSS-REFERENCE

This application is a section 371 of PCT/EP05/09442, filed 2 Sep. 2005 and published 18 May 2006 as WO 2006/050 765-A1.

FIELD OF THE INVENTION

The invention relates to an electric motor having a stator which carries a winding arrangement that is implemented to generate a rotating field.

BACKGROUND

A three-phase motor can be operated in a star-configured circuit (Y circuit) and in a delta circuit. In a star-configured circuit, when the individual windings of each phase are connected in series this is referred to as a "star series circuit," and when two individual windings per phase are connected in parallel, this is referred to as a "star double-parallel circuit" (cf. FIG. 15). When four individual windings are connected in parallel, this is referred to as a "star quad-parallel circuit." Analogous terms that are used are "delta series circuit" and "delta double-parallel circuit" (cf. FIG. 3) or "delta quad-parallel circuit."

In order to produce these different circuits, the winding ends of the individual coils must be interconnected in various ways; this requires a great deal of manual work. For example, in the case of the motor according to U.S. Pat. No. 6,177,741 B1, the stator of which is equipped with a star-configured circuit, the ends of the lacquered copper wires must be connected via soldered or crimped connections to the ends of flat conductors that are mounted on an insulating board. One of these conductors serves as a star point connector, and three other conductors serve as terminals for the U, V, and W phases. In motors for low power levels, it is also known to interconnect the ends of the individual windings using multi-layer circuit boards having printed circuits, although such designs are not suitable in cases where large currents must flow during operation.

SUMMARY OF THE INVENTION

It is therefore an object of the invention to make a novel electric motor available.

According to the invention, this object is achieved by a motor having, arranged concentrically with the rotation axis, a plurality of mutually insulated winding mounting elements. It is easily possible, for example by resistance welding, to connect the winding ends of the individual windings to the mounting elements of the associated connection elements, with the result that low contact resistance levels are obtained. The connection elements can in turn be electrically connected in the desired fashion by way of a functionally appropriate connection arrangement, for example in order to obtain a star double-parallel circuit. One such connection arrangement has conductors that are each connected via welded connections to specific associated connection elements, so that low contact resistance levels are obtained here as well. The invention thus makes possible high-grade automated production of high-quality stators that can be used at high ambient temperatures and/or with high current intensities and/or under severe stress due to vibration. One preferred application is motors for low operating voltages, such as those motors that, for safety reasons, must be used in mining, where such motors are subject to particularly severe stress due to vibration and where a high level of operating reliability is simultaneously required.

BRIEF FIGURE DESCRIPTION

Further details and advantageous refinements of the invention are evident from the exemplifying embodiments, in no way to be understood as a limitation of the invention, that are described below and depicted in the drawings.

Figure 1:
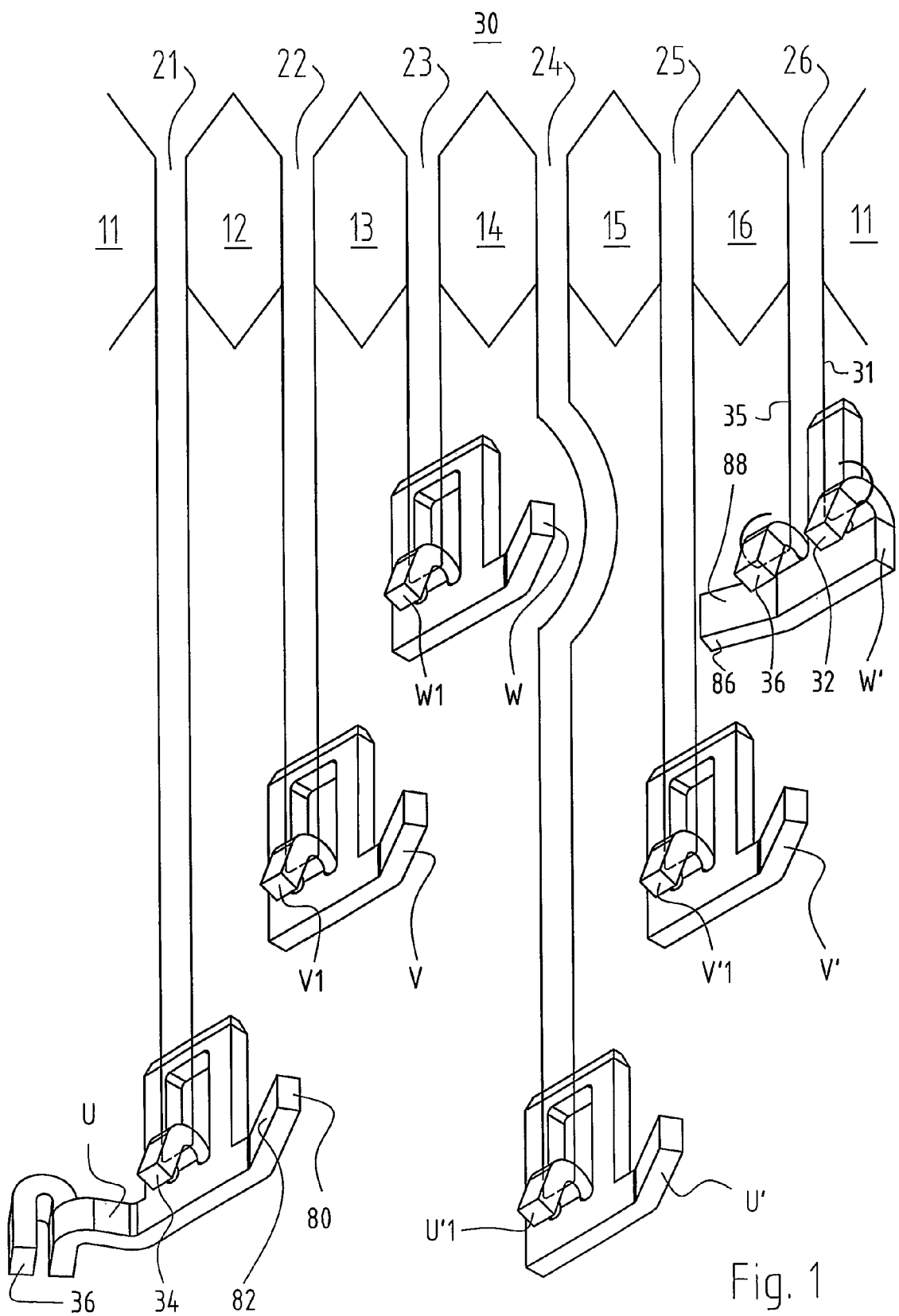
FIG. 1 is a usual depiction of a stator having six slots, six poles, and a winding provided thereon that is intended for a delta double-parallel circuit, and having electrical connection elements by way of which the electrical connections are guided between adjacent coils.
Figure 2:
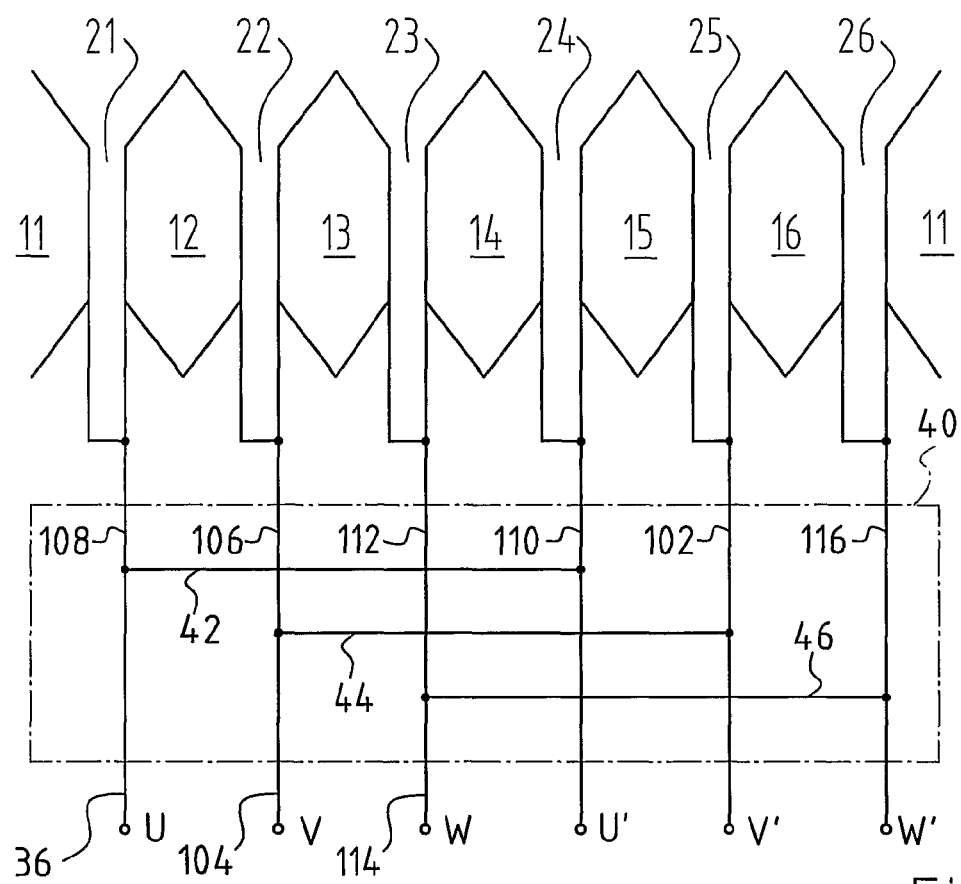
FIG. 2 is a depiction, analogous to FIG. 1, showing how a separate connection arrangement 40 converts the winding of FIG. 1 into a delta double-parallel circuit.
Figure 5:
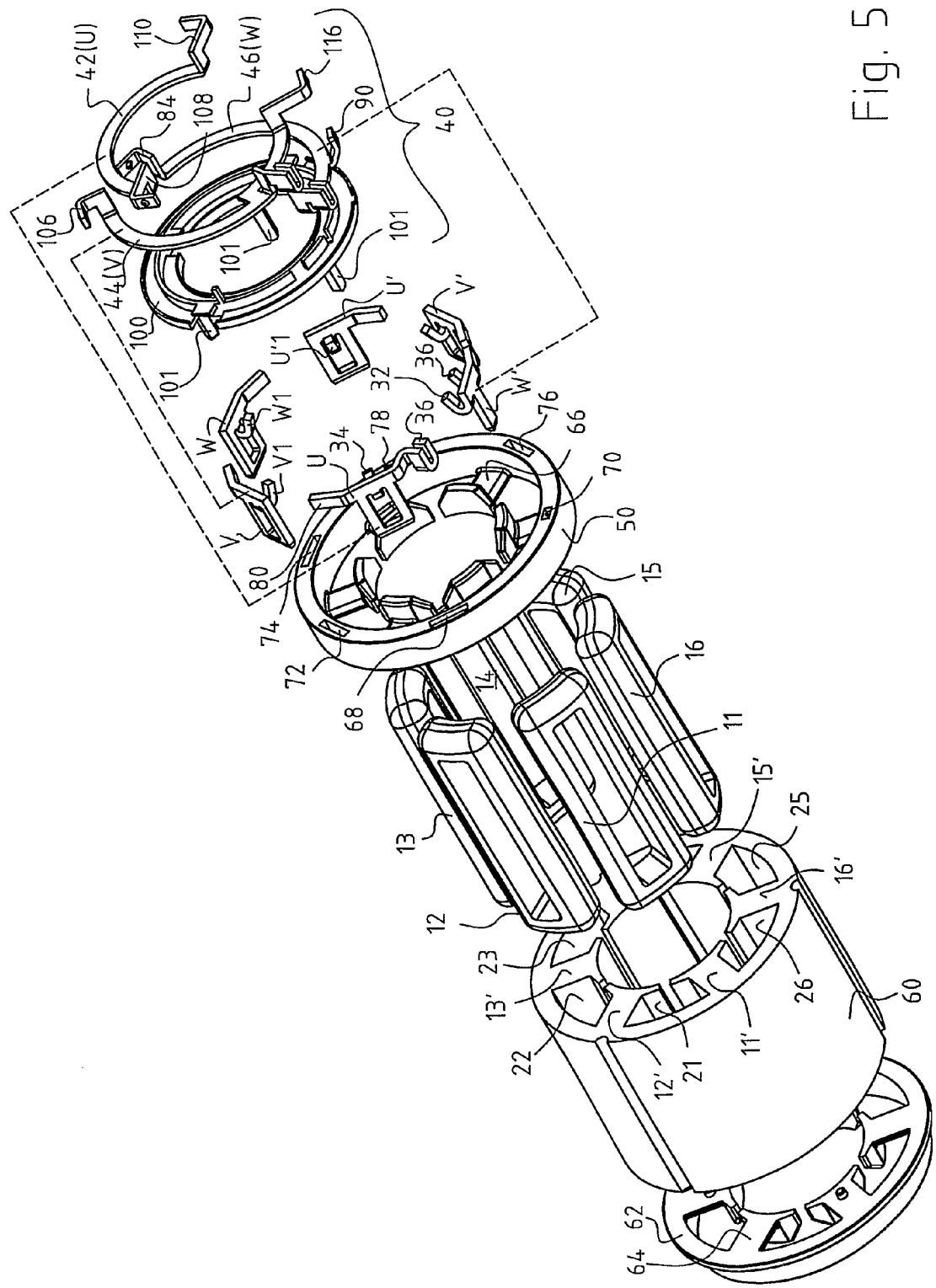
FIG. 5 is an exploded depiction of a stator that is implemented in accordance with FIG. 2.
Figure 7A:
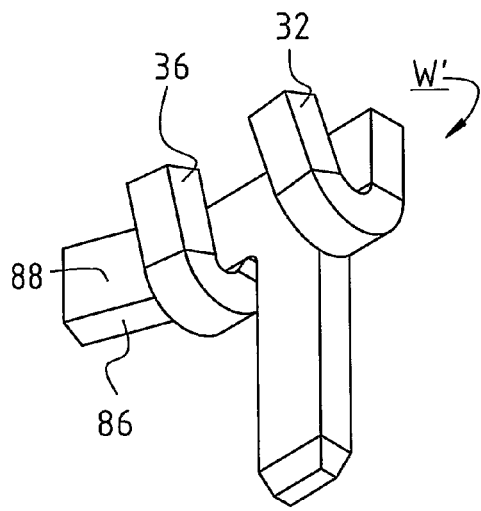
Figure 7B:
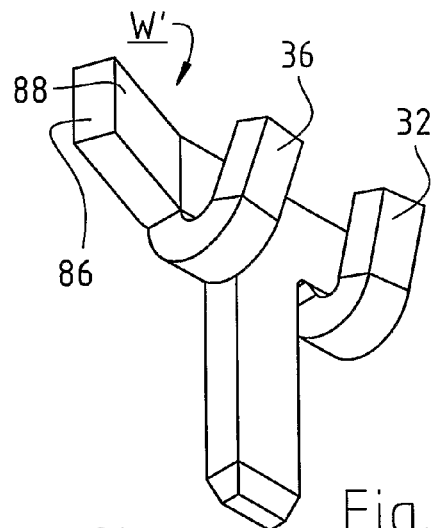
Figure 7C:
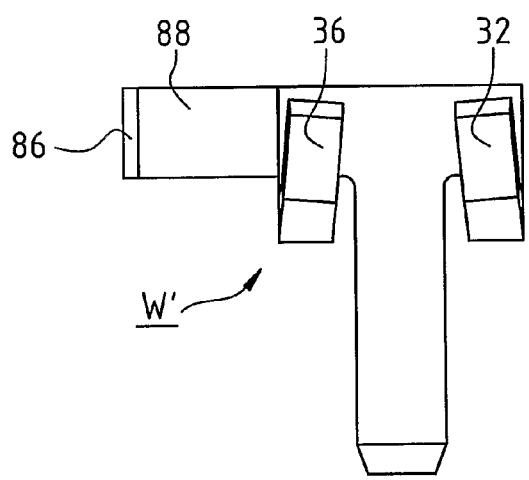
Figure 7D:
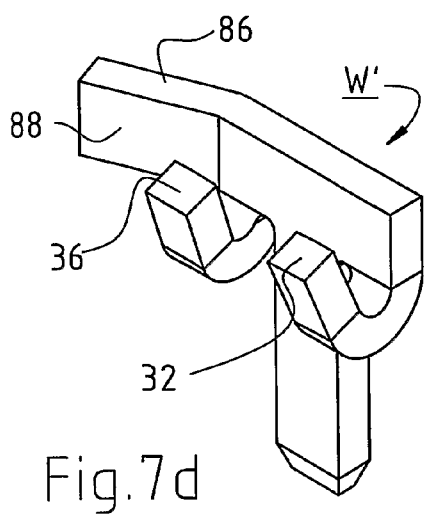
Figure 7E:
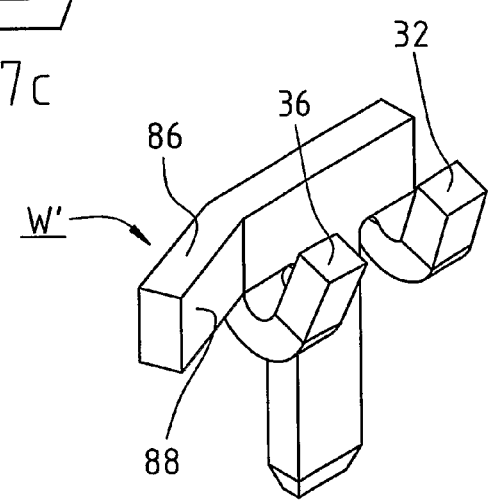
Figure 9:
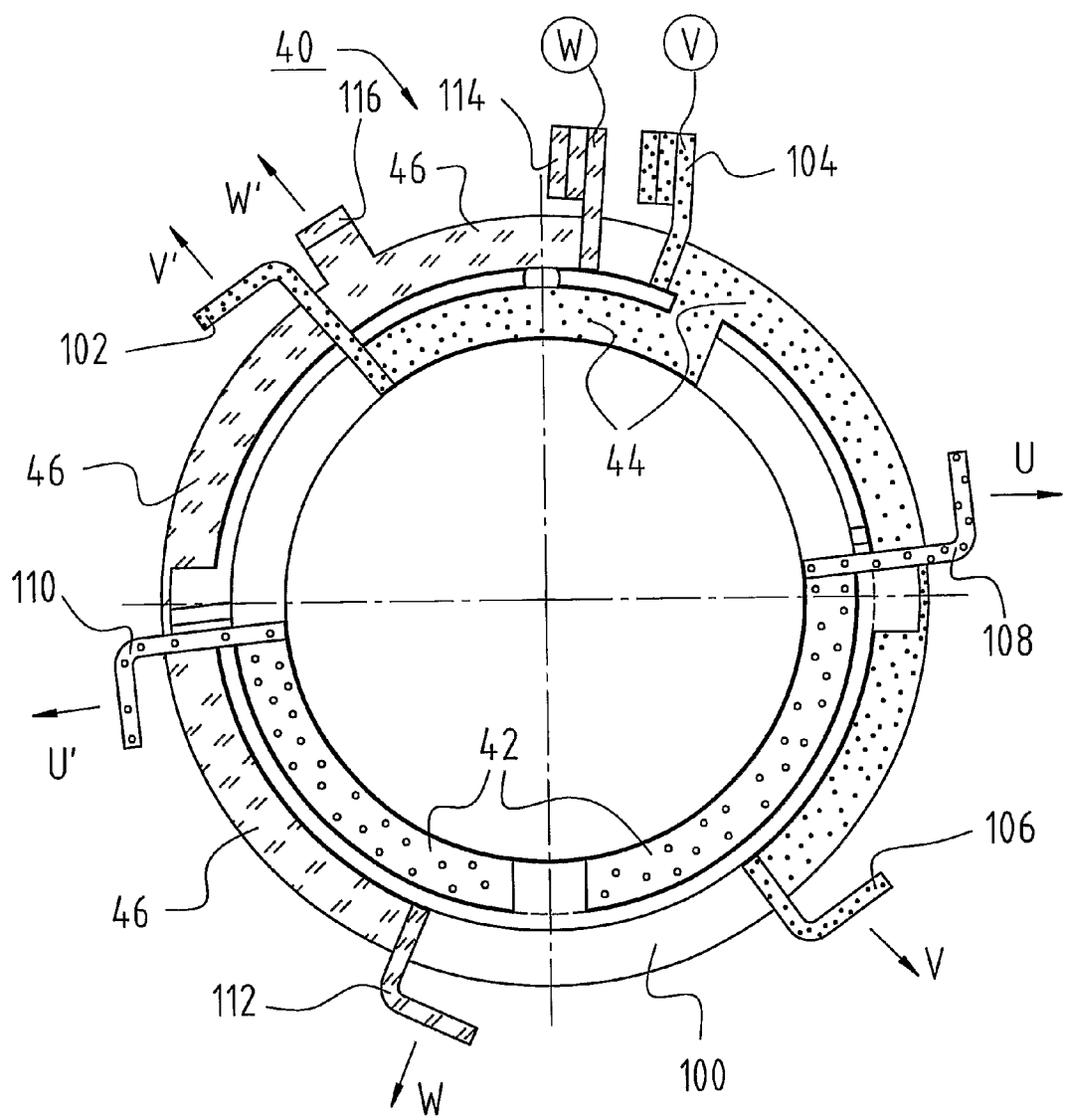
Figure 10:
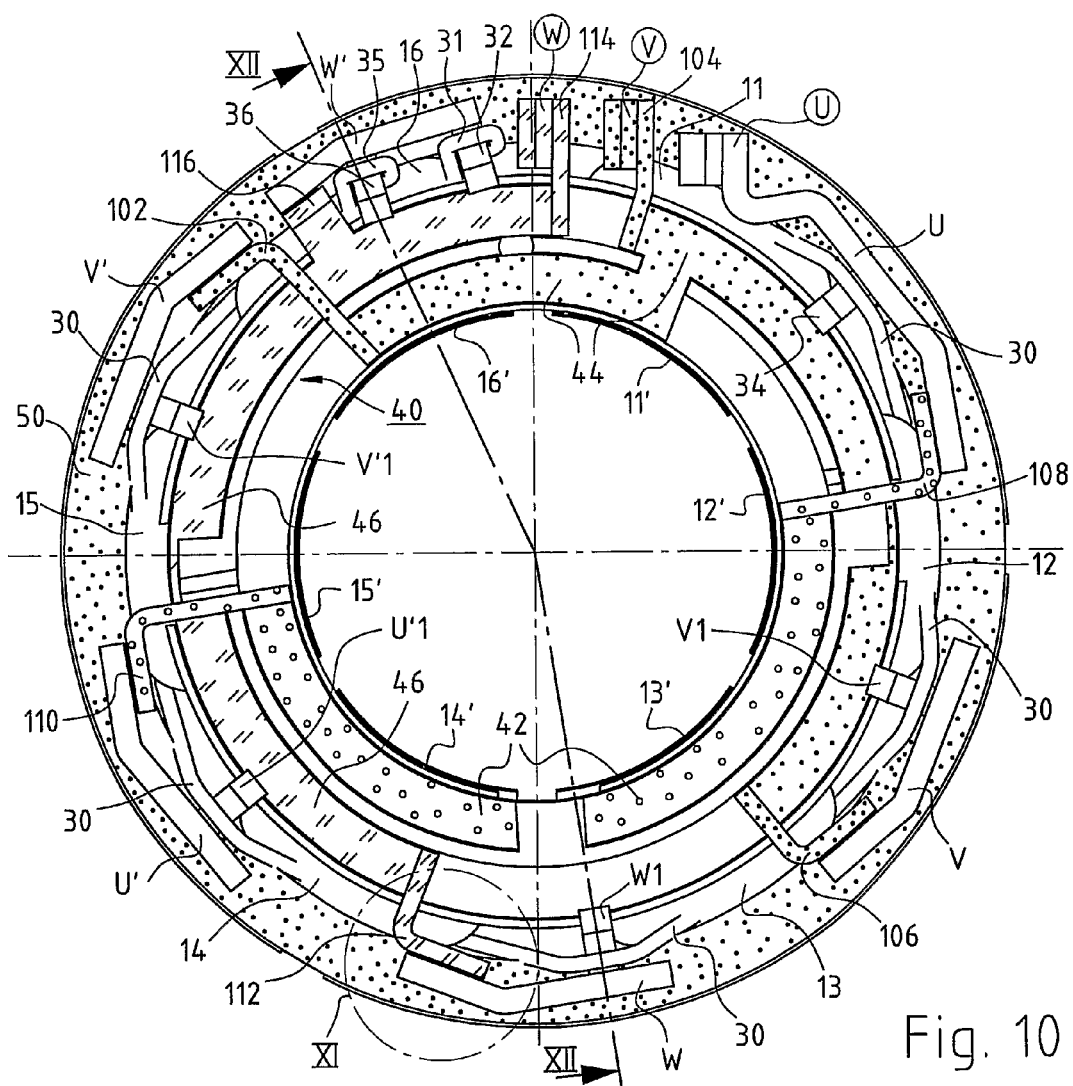
Figure 11:
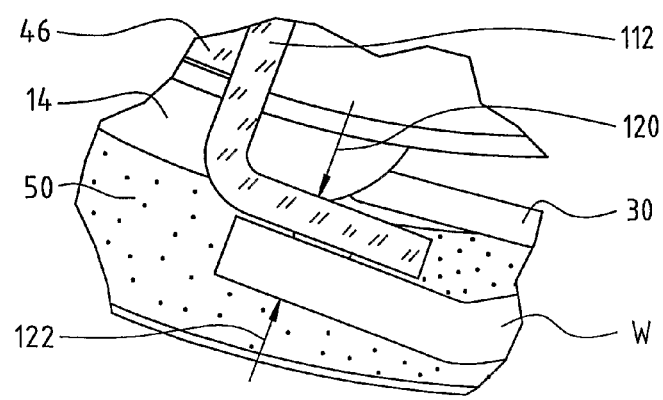
Figure 12:
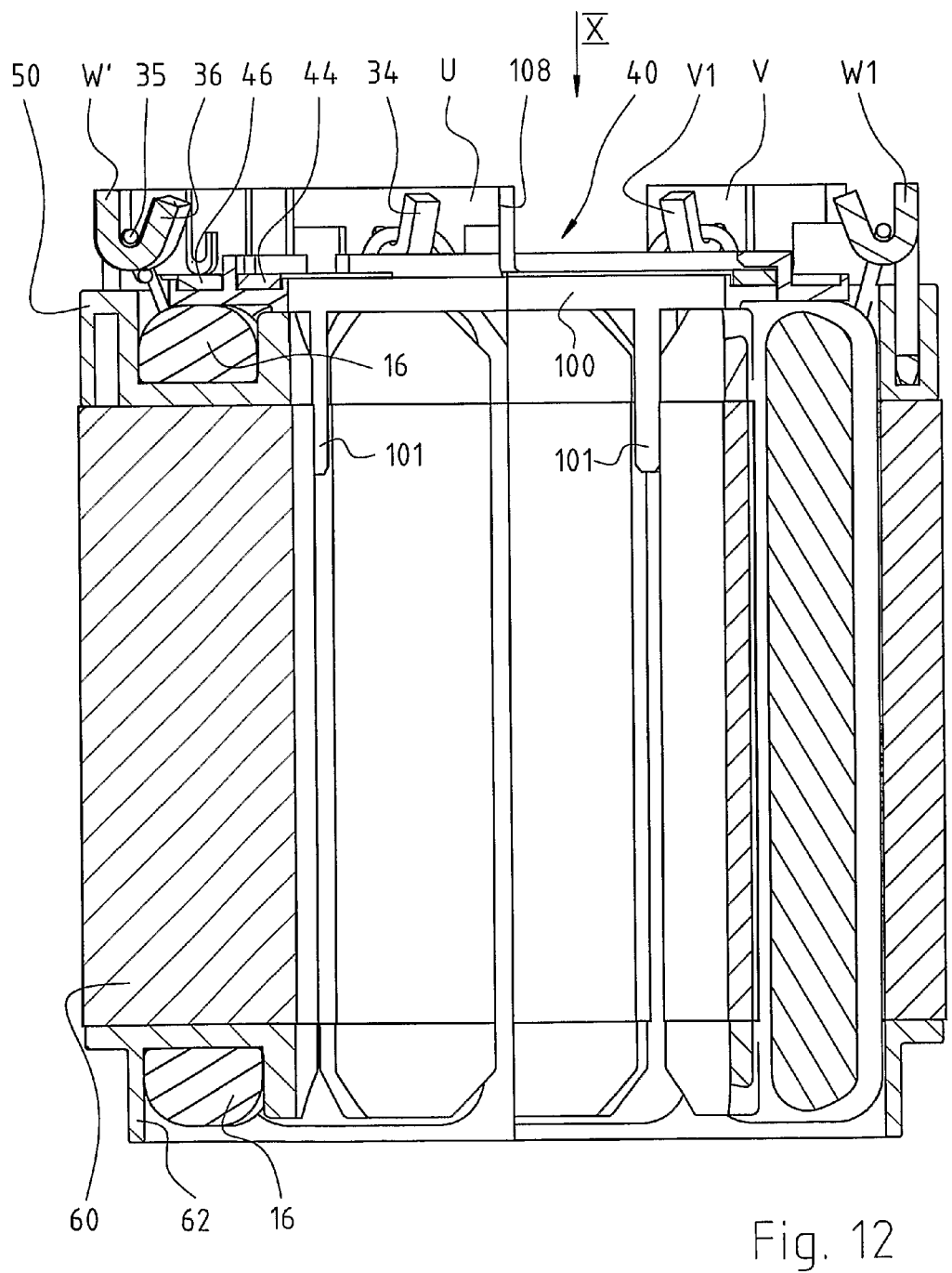
Figure 13:
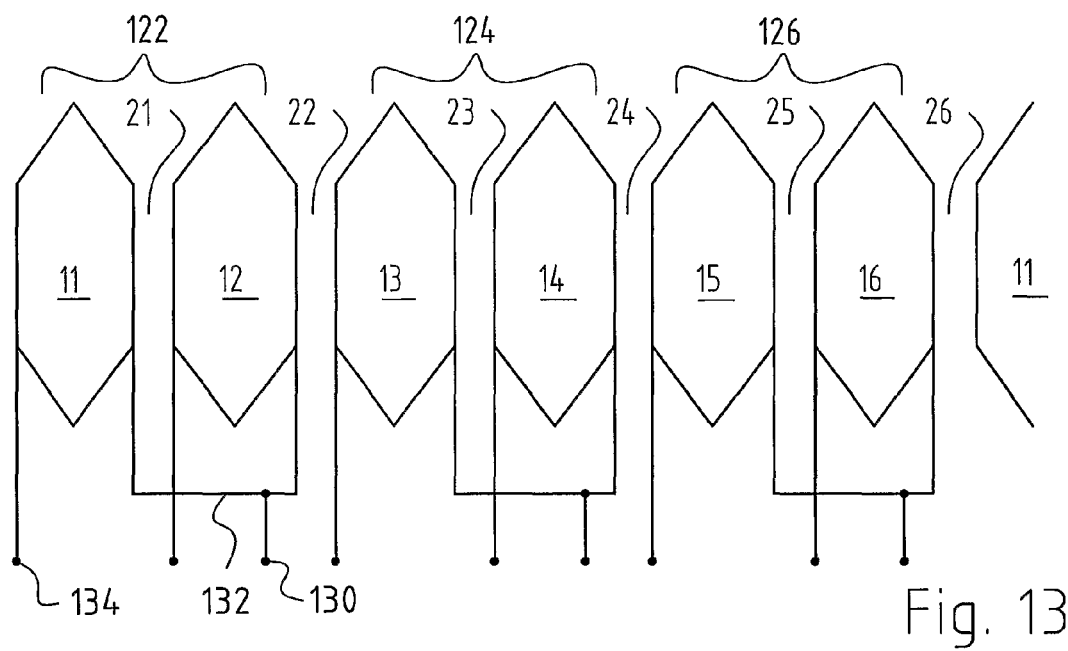
Figure 14:
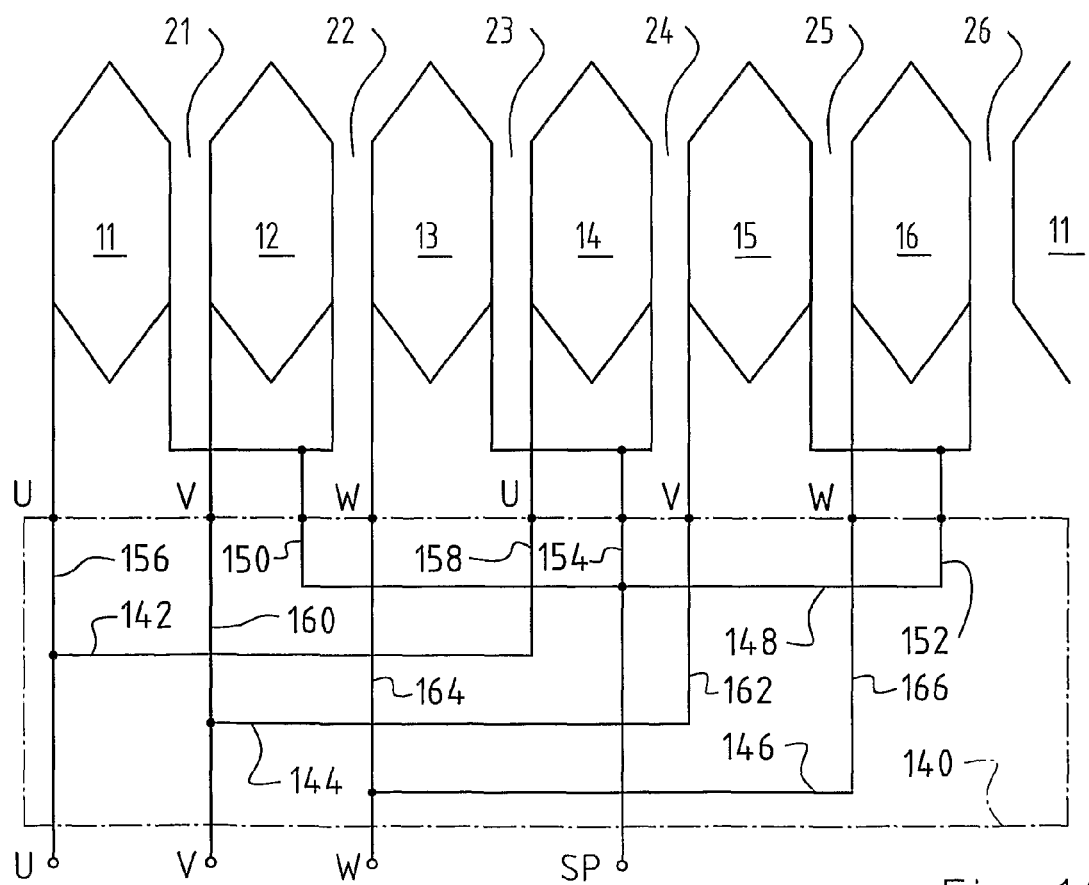
Figure 15:
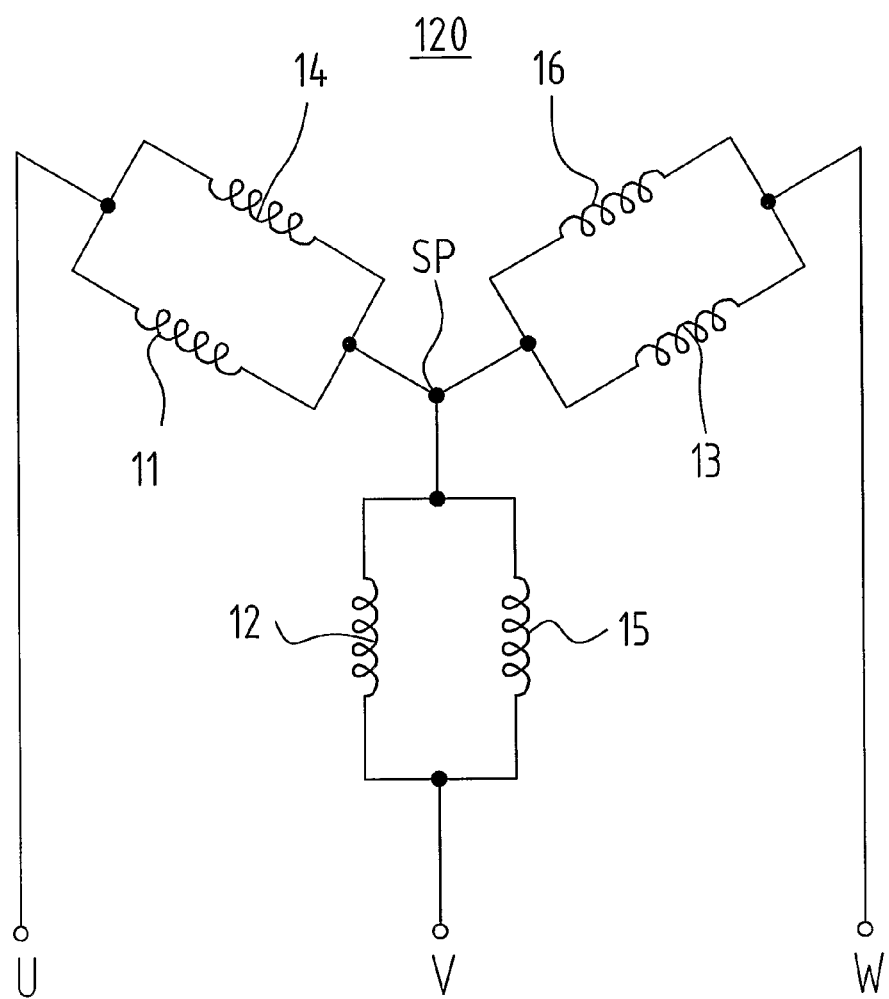
Figure 16:
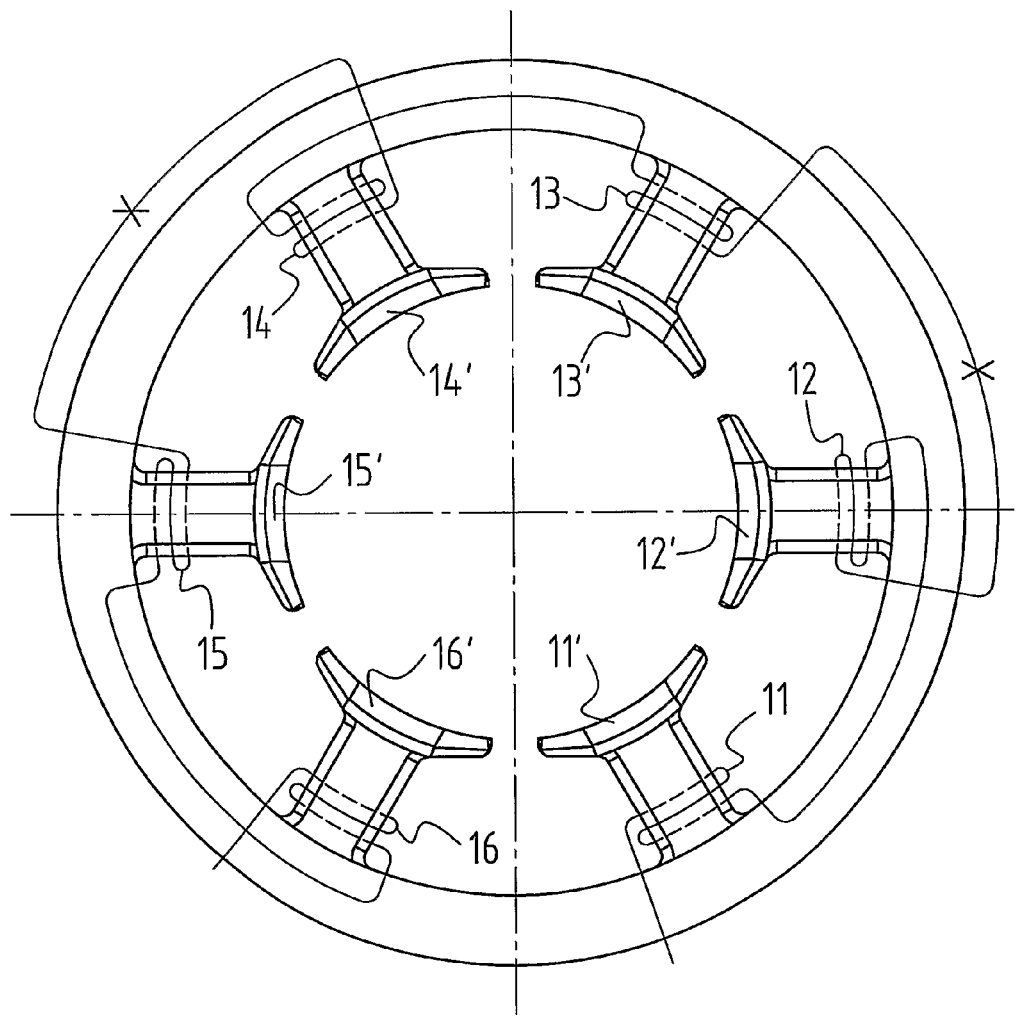
Figure 17:
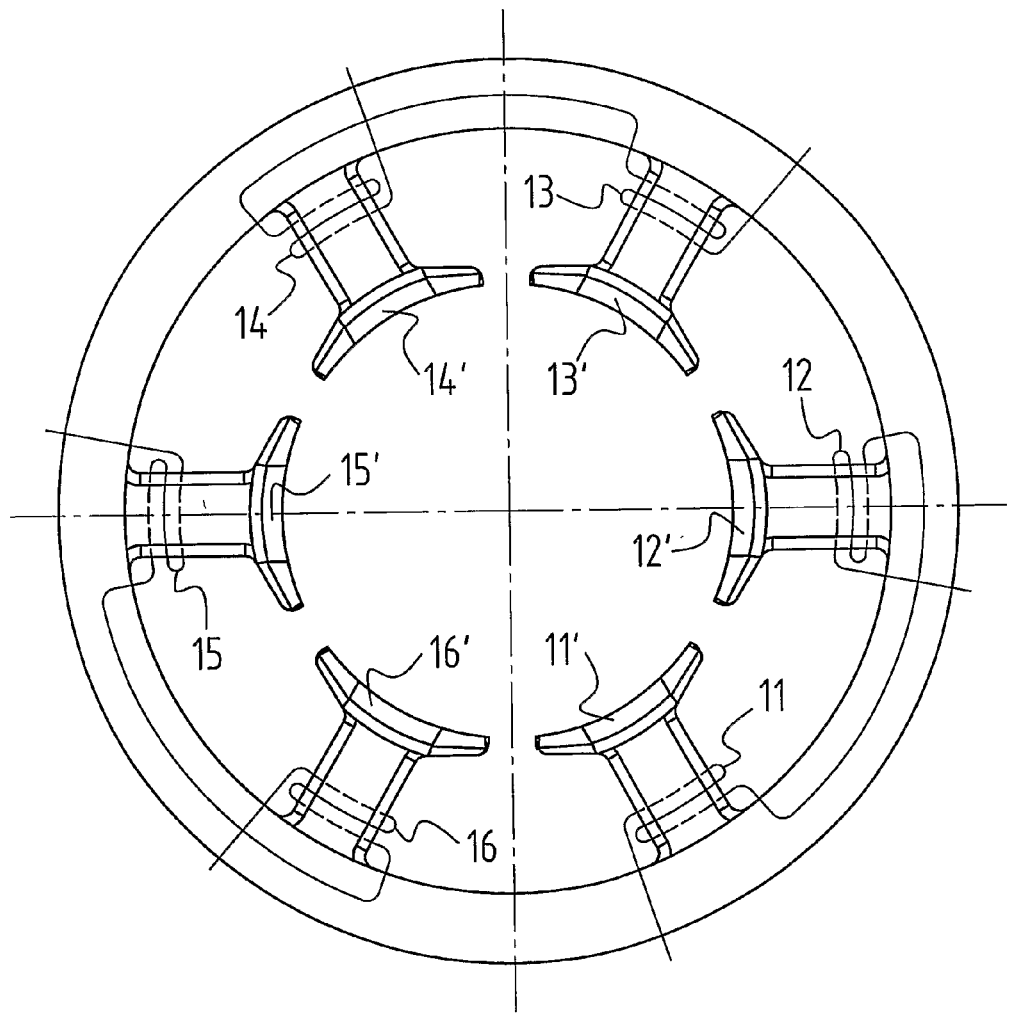
Figure 18:
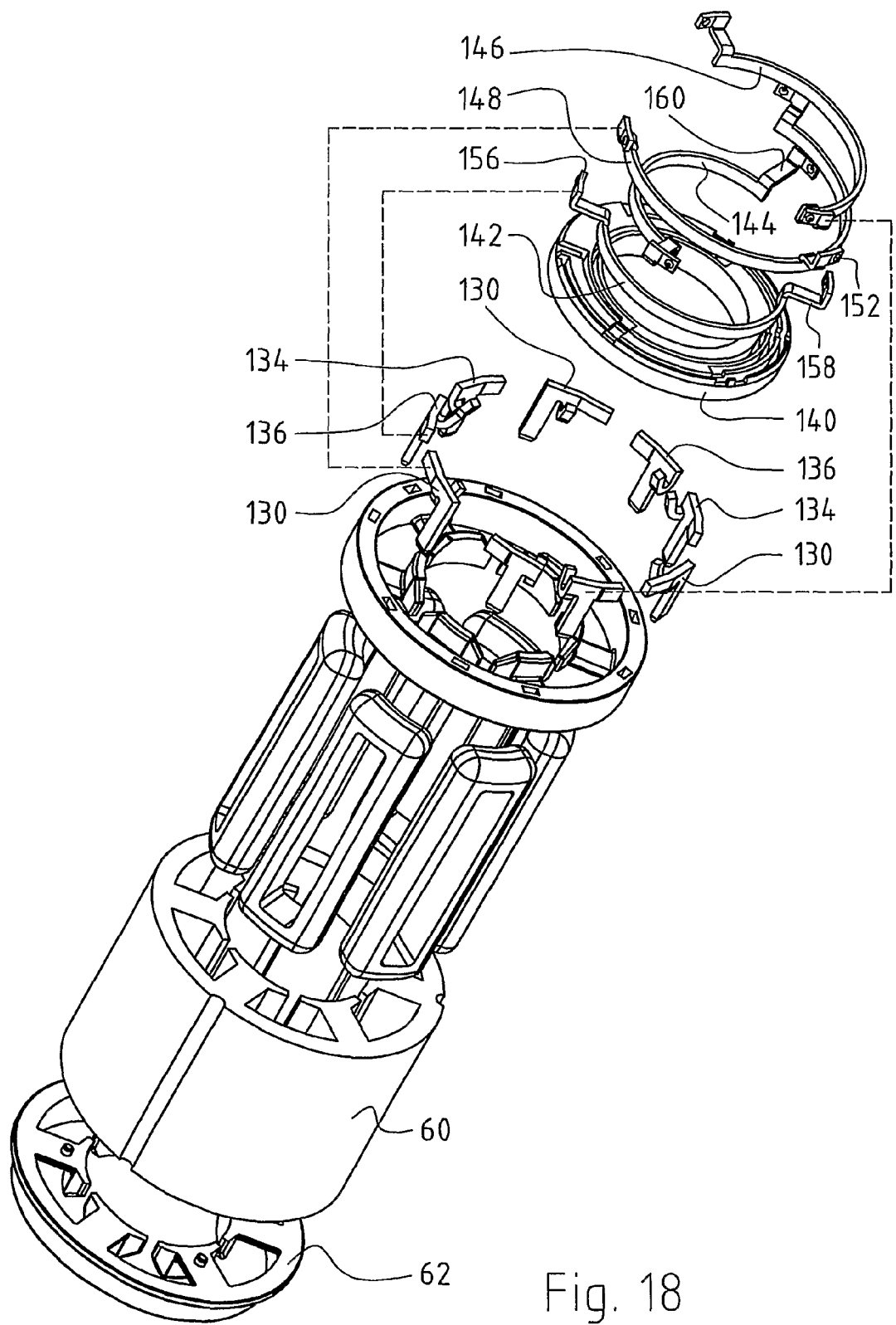
Figure 21:
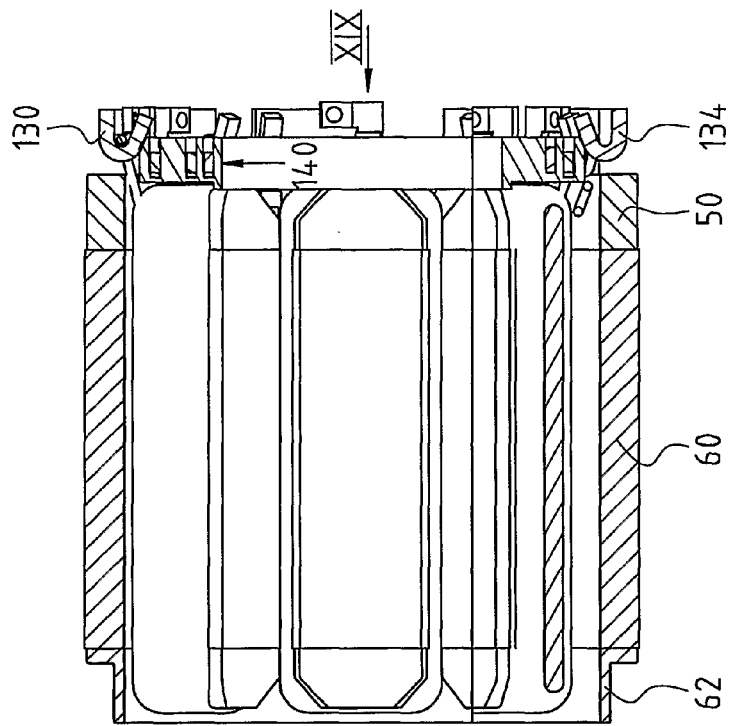
Figure 20:
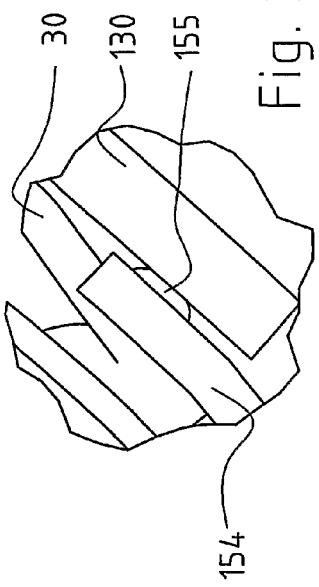
Figure 19:
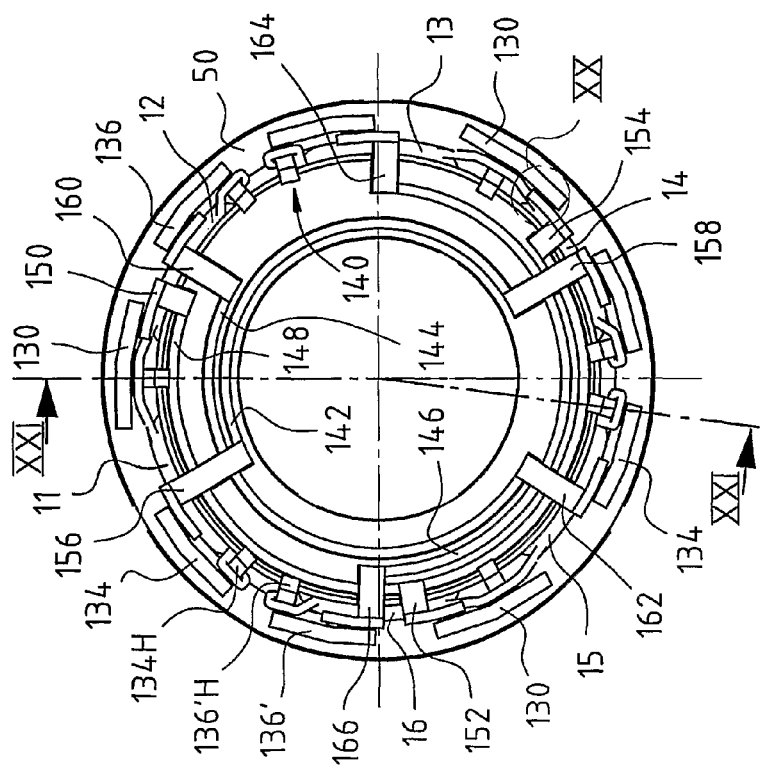

FIGS. 6*a* to 6*e* depict an electrical connection element as used in the context of FIGS. 1 and 5;

FIGS. 7*a* to 7*e* depict an electrical connection element as used in the context of FIGS. 1 and 5;

FIGS. 8*a* to 8*e* depict an electrical connection element as utilized in the context of FIGS. 1 to 5;

FIG. 9 is a plan view of a connection arrangement 40 that contains a plurality of conductors;

FIG. 10 is a plan view of the stator of FIG. 5, looking in the direction of arrow X of FIG. 12;

FIG. 11 depicts a detail XI of FIG. 10;

FIG. 12 is a section looking along line XII-XII of FIG. 10;

FIG. 13 is a depiction analogous to FIGS. 1 and 2, but for a star double-parallel circuit;

FIG. 14 shows the winding of FIG. 13 together with a separate connection arrangement 140 that complements the winding arrangement of FIG. 13 to yield a star double parallel circuit;

FIG. 15 depicts, in conventional fashion, a star double-parallel circuit according to FIG. 14;

FIG. 16 depicts a stator lamination stack that is continuously wound with a winding according to FIG. 13;

FIG. 17 shows the winding of FIG. 16 after interrupting the continuous winding arrangement, with the result that three separate winding groups were produced;

FIG. 18 is an exploded depiction in perspective;

FIG. 19 is a plan view looking in the direction of arrow XIX of FIG. 21;

FIG. 20 is an enlarged depiction of detail XX of FIG. 19; and

FIG. 21 is a section looking along line XXI-XXI of FIG. 19.

DETAILED DESCRIPTION

FIGS. 1 to 12 show a first exemplifying embodiment of the invention, namely a motor having six salient stator poles 11' to 16' on which six coils 11 to 16 are continuously and unidirectionally wound. The slot between poles 11' and 12' is labeled 21, the slot between poles 12' and 13' is labeled 22, and so on for slots 23 to 26.

Figure 3:
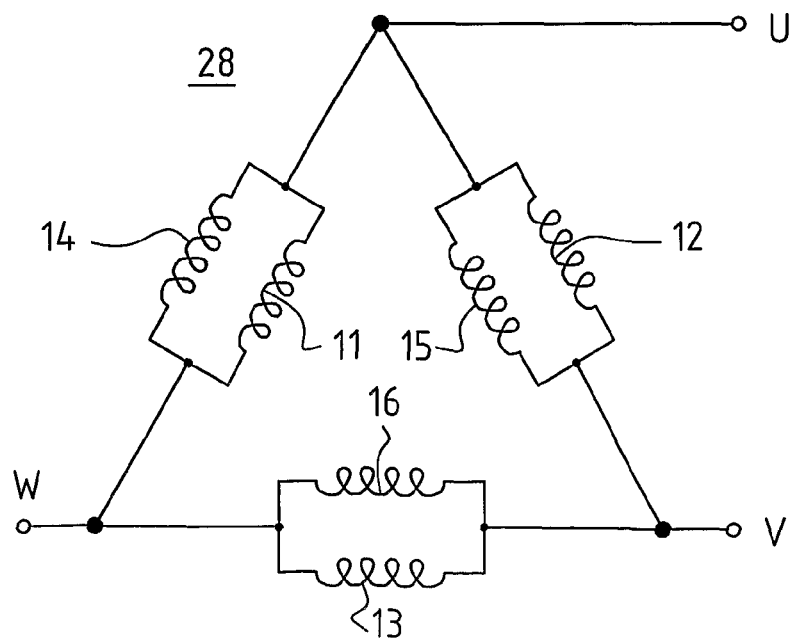
FIG. 3 depicts a delta double-parallel circuit.

This continuous winding 30 is intended for a delta double-parallel circuit 28 such as the one depicted in the usual fashion in FIG. 3.

According to FIG. 1, continuous winding 30 starts at its beginning 31 at hook 32 of an electrical connection element W', then goes to coil 11, one of whose halves is shown at the right in the FIG. 1 and the other half at the left, proceeds to a hook 34 of a connection element U that is equipped with a terminal element 36 for the U phase terminal (cf. FIG. 10), then proceeds to a coil 12 and from that to a hook V1 of a connection element V, and from there on to coil 13.

From coil 13, continuous winding 30 goes to a hook W1 of a connection element W, from there to coil 14, and from that on to a hook U'1 of a connection element U'.

Continuous winding 30 proceeds from there to coil 15, and from that on to a hook V'1 of a connection element V'.

From there, continuous winding 30 proceeds to coil 16, and from there its end 35 goes to a hook 36 of connection element W', thus closing the circuit since hooks 32 and 36 are electrically interconnected via connection element W'.

The arrangement depicted in FIG. 1 is merely an intermediate product for the manufacture of delta double-parallel circuit 28 according to FIG. 3. FIG. 2 shows how manufacture of the circuit is completed via a connection arrangement 40. Connection arrangement 40 has a connection 42 for electrical connection of connection elements U and U' of FIG. 1, also a connection 44 for electrical connection of connection elements V and V' of FIG. 1, and a connection 46 for connection of connection elements W and W' of FIG. 1. A preferred configuration of connections 42, 44, 46 will be described below.

Figure 4:
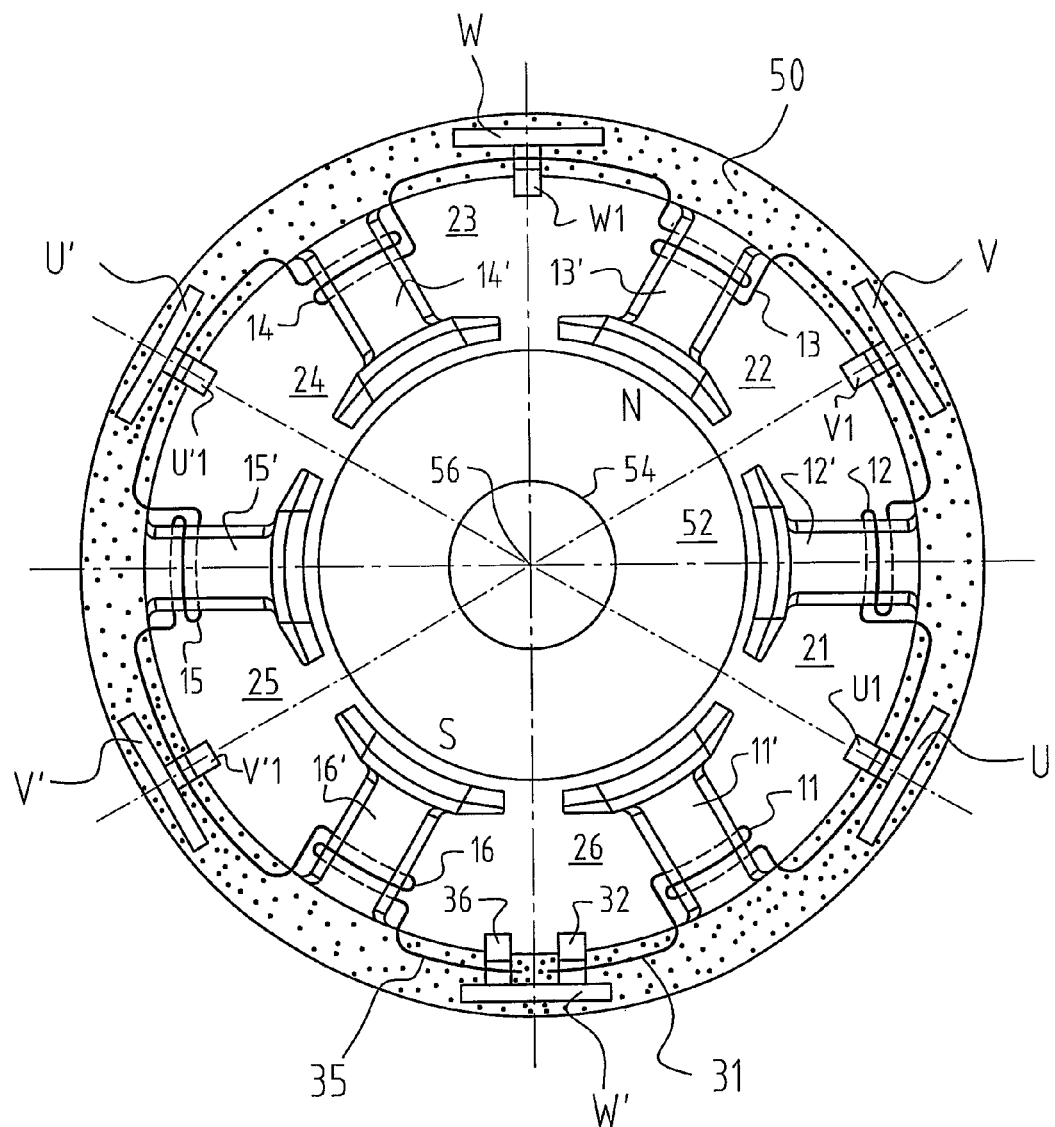
FIG. 4 depicts a stator having six slots and six teeth, and shows the winding arrangement according to FIGS. 1 to 3 arranged thereon.

Connection elements U, U', V, V', W, and W' according to FIG. 1 are mounted on an insulating ring 50 that is highlighted in gray in FIG. 4. FIG. 4 also shows a rotor 52 and its shaft 54, as well as rotation axis 56 around which rotor 52 rotates. The latter is depicted as a two-pole permanent-magnet rotor corresponding to operation as a synchronous motor or three-phase current generator, but of course it is also possible to use a rotor having a short-circuit winding, or an eddy current rotor, in order to enable operation as an asynchronous machine.

Ring 50 is located at one end of the stator and concentrically with rotation axis 56, so that connection elements U, U', V, V', W, and W' have approximately the same spacing from rotation axis 56.

FIG. 5 shows a completed stator lamination stack 60, the lamination of which has already been described with reference to FIG. 4. This lamination stack 60 is wound with the six coils 11 to 16, which have likewise already been described with reference to FIG. 4. The slots of lamination stack 60 are lined with an insulator in the usual fashion. Located at the left end (in FIG. 5) of lamination stack 60 is an annular insulation fitting 62 that constitutes parts 64 of the coil formers for the individual coils.

Parts 66 of the coil formers for the individual coils or individual windings are likewise provided on ring 50. Ring 50 is furthermore depicted with axial openings. Electrical connection element U, on which hook 34 is located, is mounted in an opening 68. Connection element W', on which the two hooks 32 and 36 are located, is mounted in an opening 70.

Connection element V, on which hook V1 is located, is mounted in an opening 72. Connection element W, on which hook W1 is located, is mounted in an opening 74 of ring 50.

Connection element V', on which hook V'l is located, is mounted in an opening 76. And lastly, connection element U', on which hook U'1 is located, is mounted in an opening 78 (not visible) located diametrically opposite opening 68.

Connection elements U, V, etc. are mounted in ring 50, e.g. by injection molding, in the context of the latter's manufacture.

FIGS. 6 to 8 show the connection elements in perspective and from various angles of view. The elements each have a laterally protruding arm that is labeled 80 in FIG. 6. This arm has a welding surface 82 on which an associated conductor 84 is mounted by resistance welding, as shown by FIG. 11 for connection element W and a conductor 112.

FIG. 7 shows connection element W' with its two hooks 32 and 36 that are each angled out approximately 20°. Element W' has a laterally protruding arm 86 having a welding surface 88 on which, according to FIGS. 5 and 9, an associated conductor 90 is mounted by resistance welding.

FIG. 8 shows a connection element 92 that is used for connection elements V, W, U', and V'. This element has a hook 94 that is angled out approximately 20°, and a laterally protruding arm 96 on which is a welding surface 98.

FIG. 9 shows a practical embodiment of connection arrangement 40 that is depicted merely schematically in FIG. 2. This arrangement contains the three conductors 42, 44, 46 in the form of flat leads that are completely embedded into plastic part 100. For illustrative reasons, part 100, also called a connection disk, is depicted in section. As FIG. 5 shows, it has three feet 101 which serve to immobilize it in the correct position on lamination stack 60. Actual mounting is accomplished by welding the conductors on.

With reference to a clock face, conductor 44 extends clockwise approximately from the 11:00 to the 5:00 position. At the 11:00 position it has an outwardly projecting bent-over arm 102 that serves, as indicated, for connection to connection element V' of FIG. 1.

At the 12:30 position, conductor 44 has an outwardly projecting terminal element 104 for the V phase of the motor. At the 5:00 position, it has an outwardly projecting bent-over arm 106 that serves for connection to connection element V of FIG. 1. As is evident, conductor 44 extends approximately from 11:00 to 1:00 on a radially inner track, and then switches to a radially outer track that extends approximately from 1:00 to 5:00. The advantage here is that although there are three conductors 44, 46, and 48, they occupy only two adjacent tracks in the radial direction.

Conductor 42 extends approximately from the 2:30 position to the 8:30 position. At the 2:30 position it has a radially outwardly projecting arm 108 for connection to connection element U, and in the 8:30 position an arm 110 for connection to connection element U' of FIG. 1. It therefore connects elements U and U'.

Conductor 46 extends approximately from the 6:30 position, where an outwardly projecting arm 112 is located for connection to connection element W, to the 12:15 position, where a terminal element 114 for the W phase is located. An outwardly projecting short arm 116 for connection to connection element W' is located approximately at the 10:45 position.

As already described, the connection elements that are depicted in FIGS. 6 to 8 have welding surfaces 82, 88, and 98, and on the latter the arms 102, 106, 108, 110, 112, and 116 are mounted (preferably over a large area) by resistance welding in order to achieve a low contact resistance. It is useful here for one of the two parts to be equipped with a welding button, as depicted in FIG. 20 where a welding button 155 is used.

These connections are depicted in FIGS. 10, 11, and 12, which show the wound stator lamination stack 60 on which the connection arrangement is installed. FIG. 11 shows a detail, and arrows 120, 122 indicate how arm 112 is pressed by means of a welding clamp against connection element W and electrically welded to it.

The portions of wire 30 that were hooked into hooks 34, V1, W1, U'1, V'1, 36, and 32 are welded in such a way that these hooks are bent together and simultaneously heated by means of a welding clamp. Wire 30 is likewise heated in this context, so that its insulation vaporizes and it becomes welded to the relevant connection element.

FIGS. 13 to 21 show a second exemplifying embodiment of the invention, here as a star double-parallel circuit 120 as depicted in FIG. 15. As compared with the delta circuit of FIG. 3, an additional connector 148 is necessary here for star point SP.

Parts identical or functionally identically to those in FIGS. 1 to 12 are labeled with the same reference characters in FIGS. 13 to 21, and usually are not described again.

As FIG. 13 shows, here the entire winding arrangement is divided into groups of two. Coils 11 and 12 form a winding group 122, coils 13 and 14 a winding group 124, and coils 15 and 16 a winding group 126.

As FIG. 16 shows, here as well all the individual windings 11 to 16 are wound together, but coils 11 and 12 have an opposite winding direction, as do coils 13 and 14 and coils 15 and 16. Here as well, the connections between adjacent coils are hooked, upon winding, into hooks of connection elements, as was described in detail with reference to FIG. 1, except that here the connection elements have a slightly different shape, as is clearly apparent from FIG. 18. Two connections are interrupted in FIG. 16 at points X.

Mounting Elements

FIG. 18 shows that three types of connection elements are used, namely a type 130 that, for example in the context of coil group 122, is connected to lead 132 that interconnects coils 11 and 12. Connection elements of type 130 are connected to star point lead 148.

Also used is a type 134 of connection element that is connected to the left end of a winding group, e.g. in FIG. 19 to coil 11; and lastly a type 136 that is connected to the respective right end of a winding group, e.g. in FIG. 19 to coil 12 or, as connection element 136', to coil 16.

As FIG. 19 shows, winding wire 30 is interrupted between connection elements 136' and 134 after winding, and the wire ends thereby created are each mechanically connected, by being bent over, to the associated hooks 136'H, 134H of the associated connection element 136', 134.

This enables simple connection to the connection elements.

FIG. 14 shows connection arrangement 140, which contains a total of four conductors 142 (U), 144 (V), 146 (W), and 148 (SP), and this connection arrangement has, according to FIGS. 19 and 21, the shape of a ring 140 into which these four conductors are embedded as conductors standing on edge. These conductors are, in practice, completely surrounded by the plastic of ring 140 and insulated thereby.

Proceeding from conductor 148 for the star point are three radial leads 150, 152, 154 that are connected to the corresponding parts of the winding that are clearly evident from FIG. 14 and FIG. 19.

From conductor 142 (U), a radial connection 156 proceeds to coil 11 and a radial connection 158 to coil 14.

From conductor 144 (V), a radial connection 160 proceeds to coil 12 and a radial connection 162 to coil 15.

From conductor 146 (W), a radial connection 164 proceeds to coil 13 and a radial connection 166 to coil 16.

FIG. 20 shows the kind of welded connection between a connection element (in this case one of connection elements 130) and a radial connector 154 for conductor 148 (star point). This kind of connection is the same for all radial connectors. Radial connector 154 has on its radially outer side a welding button 155, and during the welding operation, connector 154 is pressed by the jaws of the welding clamp against the corresponding surface of connection element 130 and thereby welded to it.

The procedure for electrical and mechanical connection is thus exactly the same as in the context of FIGS. 1 to 12, where it is described in great detail, so that in the interest of brevity the reader may be referred to that portion of the description.

Numerous variants and modifications are of course possible within the scope of the present invention. The invention is very advantageous in that production can largely be automated, and it is suitable for motors that consume large motor currents at low operating voltages and can consequently generate a large torque. As depicted in FIG. 9, the motor terminals can be provided partly on connection arrangement 40, so that a connection arrangement of this kind represents a highly complex part that can take on a plurality of functions; production of this arrangement as a single part, and subsequent insertion thereof into the motor, are also much simpler than wiring a motor by hand.

What is claimed is:

1. An electric motor comprising
   a rotor (52) rotatable around a rotation axis (56);
   a stator (60) arranged around said rotor (52), which stator is equipped with poles (11' to 16') on each of which is implemented an individual winding (11 to 16), which individual windings are wound from wire and together form
   a winding arrangement (30) that serves to generate a rotating field, the wire having at least one connecting wire section between one individual winding and another individual winding, in the manner of a continuous winding arrangement, furthermore comprising
   at least one arrangement, arranged approximately concentrically with the rotation axis (56), having electrical connection elements (U, V, W, U', V', W') that are equipped with mounting elements (34, V1, W1, U'1, V'1, 32, 36) to each of which connection elements (U,V,W, U', V', W') two associated individual windings are mechanically and electrically connected,
   at least some of the connections being between a mounting element (34, V1, W1, U'1, V'1) and a connecting wire section; and
   a connection arrangement (40) including a ring (100, 140) of insulating material into which conductors (42, 44, 46) are embedded, and in which conductive elements project outward from the conductors (42, 44, 46), which conductive elements are configured at their free ends (102, 106, 108, 110, 112, 116) for a welded connection to an associated connection element (U, V, W, U', V', W'),
   a free end of each of which is connected, by means of a welded connection (155), to connection elements of the stator that are associated with said conductive elements, in order to electrically interconnect said connection elements, associated with said conductors, in a predetermined fashion; and wherein
   the outwardly projecting conductive elements are each bent over adjacent their respective free ends, the bent-over part extending substantially parallel to the portion of the associated connection element to which said bent-over part is welded.

2. The electric motor according to claim 1, wherein the individual windings (11 to 16) are wound from wire, and the mounting elements of the connection elements are so arranged that a placement of the winding wire (30) into at least some of said connection elements, during the winding operation of the relevant individual winding, is possible.

3. The electric motor according to claim 2, wherein
a connection element is provided in a region against a mounting element having a connection surface (82; 88; 98) for welded connection to an element of the connection arrangement (40).

4. The electric motor according to claim 2, wherein the connection elements are provided on an insulating part (40), which part is arranged on the stator (60).

5. The electric motor according to claim 1, wherein
a connection element is provided in a region against a mounting element having a connection surface (82; 88; 98) for welded connection to an element of the connection arrangement (40).

6. The electric motor according to claim 5, wherein the connection elements are provided on an insulating part (40), which part is arranged on the stator (60).

7. The electric motor according to claim 1, wherein
the connection elements are provided on an insulating part (40), which part is arranged on the stator (60).

8. The electric motor according to claim 7, wherein parts of coil formers for the individual windings of the stator are provided on the insulating part.

9. The electric motor according to claim 8, wherein, adjacent a welded connection, at least one of
an associated connection element and
a conductor of the connection arrangement (40) is equipped with a welding button (155).

10. The electric motor according to claim 7, wherein, adjacent a welded connection, at least one of
an associated connection element and
a conductor of the connection arrangement (40) is equipped with a welding button (155).

11. The electric motor according to claim 1, wherein,
adjacent a welded connection, at least one of
an associated connection element and
a conductor of the connection arrangement (40)
is equipped with a welding button (155).

12. The electric motor according to claim 1, wherein the conductive elements are each equipped at their respective free end with a welding button (155), in order to facilitate a resistance-welded connection to
the associated portion of the relevant connection element.

13. The electric motor according to claim 12, wherein, at the points at which they are embedded into the ring (40; 140), the conductors (42, 44, 46; 142, 144, 146, 148) are surrounded in insulating fashion by said ring.

14. The electric motor according to claim 1, wherein, at the points at which they are embedded into the ring (40; 140), the conductors (42, 44, 46; 142, 144, 146, 148) are surrounded in insulating fashion by said ring.

15. The electric motor according to claim 1, wherein, at the points at which they are embedded into the ring (40; 140), the conductors (42, 44, 46; 142, 144, 146, 148) are surrounded in insulating fashion by said ring.

16. The electric motor according
to claim 1, wherein said connection elements project outward from the conductors (42, 44, 46) and from the ring (100, 140).

* * * * *